(12) United States Patent
Kato

(10) Patent No.: US 10,401,774 B2
(45) Date of Patent: Sep. 3, 2019

(54) IMAGE FORMING APPARATUS

(71) Applicant: KYOCERA Document Solutions Inc., Osaka (JP)

(72) Inventor: Masaki Kato, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/984,891

(22) Filed: May 21, 2018

(65) Prior Publication Data
US 2018/0341211 A1    Nov. 29, 2018

(30) Foreign Application Priority Data
May 26, 2017 (JP) ................. 2017-105117

(51) Int. Cl.
| | |
|---|---|
| B65H 5/06 | (2006.01) |
| B65H 7/02 | (2006.01) |
| G06F 1/08 | (2006.01) |
| G06F 1/28 | (2006.01) |
| G06F 1/30 | (2006.01) |
| G06F 3/12 | (2006.01) |
| H02P 3/06 | (2006.01) |

(Continued)

(52) U.S. Cl.
CPC ......... *G03G 15/6529* (2013.01); *B65H 5/062* (2013.01); *B65H 7/02* (2013.01); *G03G 15/5004* (2013.01); *G03G 15/80* (2013.01); *G06F 1/08* (2013.01); *G06F 1/28* (2013.01); *G06F 1/30* (2013.01); *G06F 1/324* (2013.01); *G06F 3/1229* (2013.01); *H02P 3/06* (2013.01); *H02P 3/14* (2013.01); *H02P 9/00* (2013.01); *H02P 9/006* (2013.01); *B65H 2555/25* (2013.01); *B65H 2601/11* (2013.01); *G03G 2215/00548* (2013.01)

(58) Field of Classification Search
CPC .......... G03G 15/6529; G03G 15/5004; G03G 15/80; G03G 2215/00548; B65H 5/062; B65H 7/02; B65H 2555/25; G06F 3/1229; H02P 3/06; H02P 3/14; H02P 9/00; H02P 9/006; G65H 2601/01
See application file for complete search history.

(56) References Cited

U.S. PATENT DOCUMENTS

| 2014/0198337 A1* | 7/2014 | Nakajima | ............ G06K 15/4055 358/1.14 |
| 2018/0269794 A1* | 9/2018 | Arimoto | ............ H02M 3/33569 |

FOREIGN PATENT DOCUMENTS

| JP | 2008-199707 | 8/2008 |
| JP | 2010-028972 | 2/2010 |

* cited by examiner

*Primary Examiner* — Joseph S Wong

(57) ABSTRACT

An image forming apparatus includes a roller, a motor, a control circuit, an interlock switch, and a regeneration diode. The roller is configured to transport a printing sheet or a document sheet. The motor is configured to drive the roller and the motor is supplied electric power from a predetermined power supply system. The control circuit is connected to the predetermined power supply system. The interlock switch is arranged between the motor and the control circuit in the power supply system. The regeneration diode is arranged to the interlock switch. Further, the control circuit includes a processor that acts in accordance with a program, and increases power consumption of the processor by changing an action of the processor if the interlock switch breaks power supply from the power supply system to the motor.

4 Claims, 2 Drawing Sheets

(51) Int. Cl.
   *H02P 3/14*     (2006.01)
   *H02P 9/00*     (2006.01)
   *G03G 15/00*    (2006.01)
   *G06F 1/324*    (2019.01)

IMAGE FORMING APPARATUS

CROSS-REFERENCE TO RELATED APPLICATIONS

This application relates to and claims priority rights from Japanese Patent Application No. 2017-105117, filed on May 26, 2017, the entire disclosures of which are hereby incorporated by reference herein.

BACKGROUND

1. Field of the Present Disclosure

The present disclosure relates to an image forming apparatus.

2. Description of the Related Art

In an image forming apparatus such as a printer or a multi function peripheral, when a failure such as jam occurs, a user pulls out a sheet such as paper sheet or transparency stopped in the middle of a transportation path and thereby solves the failure. When pulling out a sheet, a motor that drives a transportation roller is caused to rotate through the roller. Consequently, electromotive force is induced in the motor. A control circuit operates with a power supply voltage and such electromotive force increases the power supply voltage, and thereby the control circuit may take an improper action.

Therefore, when an image forming apparatus (hereinafter called "a first image forming apparatus"), using a detection circuit, detects that electromotive force of a motor causes a power supply voltage to exceed a reference voltage, the image forming apparatus controls a switching element for motor driving so as to make a current due to the electromotive force flow to a ground and thereby restrains a rise of the power supply voltage.

Further, another image forming apparatus (hereinafter called "a second image forming apparatus") includes a three-electrode interlock switch arranged between a power supply (here 24 Volt system) for motor driving and the motor; and in a normal status, electric power is supplied through the interlock switch to the motor, and when the interlock switch is activated, the motor is electrically connected to a power supply (here 5 Volt system) for an internal system control system. Thus, in order to protect a circuit of a motor driving system, the electric power due to the electromotive force is consumed in the internal system control system.

However, the first image forming apparatus is required to be added the aforementioned detection circuit, and the second image forming apparatus is required to be added the three-electrode interlock switch, and therefore a cost of the apparatus increases.

SUMMARY

An image forming apparatus according to an aspect of the present disclosure includes a roller, a motor, a control circuit, an interlock switch, and a regeneration diode. The roller is configured to transport a printing sheet or a document sheet. The motor is configured to drive the roller, the motor supplied electric power from a predetermined power supply system. The control circuit is connected to the predetermined power supply system. The interlock switch is arranged between the motor and the control circuit in the power supply system. The regeneration diode is arranged to the interlock switch. Further, the control circuit includes a processor configured to act in accordance with a program, and increases power consumption of the processor by changing an action of the processor if the interlock switch breaks power supply from the power supply system to the motor.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
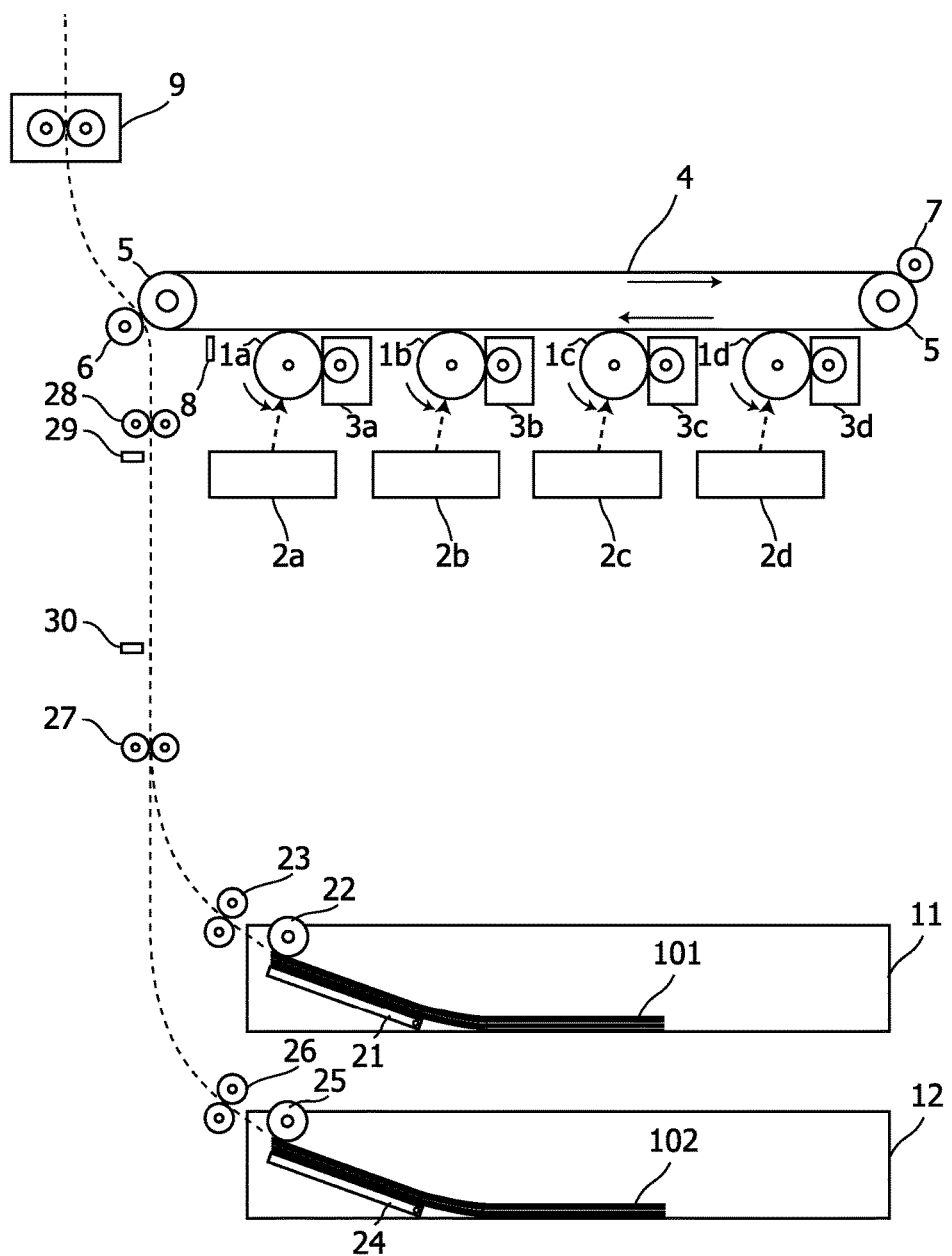
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus shown in FIG. 1 is an apparatus including an electrographic-type printing function, such as a printer, a facsimile machine, a copier, or a multi function peripheral.

The image forming apparatus in this embodiment includes a tandem-type color development device. This color development device includes photoconductor drums 1a to 1d, exposure devices 2a to 2d, and development units 3a to 3d. The photoconductor drums 1a to 1d are photoconductors of four colors: Cyan, Magenta, Yellow and Black. For instance, the photoconductor drums 1a to 1d are made of amorphous silicon.

The exposure devices 2a to 2d are devices that form electrostatic latent images by irradiating the photo conductor drums 1a to 1d with laser light, respectively. The laser light is scanned in the direction (the primary scanning direction) perpendicular to the rotation direction (the secondary scanning direction) of the photo conductor drum 1a, 1b, 1c or 1d. The exposure devices 2a to 2d include laser scanning units that include laser diodes as light sources of the laser light, optical elements (such as lens, mirror and polygon mirror) that guide the laser light to the respective photo conductor drums 1a to 1d.

Further, in the periphery of each one of the photo conductor drums 1a to 1d, a charging unit such as scorotron, a cleaning device, a static electricity eliminator and the like are disposed. The cleaning device removes residual toner on each one of the photo conductor drums 1a to 1d after primary transfer. The static electricity eliminator eliminates static electricity of each one of the photo conductor drums 1a to 1d after primary transfer.

The development unit 3a, 3b, 3c or 3d includes a toner cartridge and a development device. The toner cartridge contains toner of one of four colors: Cyan, Magenta, Yellow, and Black. The toner is supplied from a toner hopper in the toner cartridge to the development device. The development device adheres the toner on the photoconductor drum 1a, 1b, 1c, or 1d. The development unit 3a, 3b, 3c, or 3d forms a toner image by adhering the toner to an electrostatic latent image on the photoconductor drum 1a, 1b, 1c, or 1d. An unshown toner conveyance unit is driven by a driving device such as a motor and conveys the toner from the toner hopper to the development device.

The photoconductor drum 1a, the exposure device 2a and the development unit 3a perform development of Magenta. The photoconductor drum 1b, the exposure device 2b and the development unit 3b perform development of Cyan. The photoconductor drum 1c, the exposure device 2c and the development unit 3c perform development of Yellow. The photoconductor drum 1d, the exposure device 2d and the development unit 3d perform development of Black.

The intermediate transfer belt 4 is a loop-shaped image carrier (here an intermediate transfer member), and contacts the photoconductor drums 1a to 1d. Toner images on the photoconductor drums 1a to 1d are primarily transferred onto the intermediate transfer belt 4. The intermediate transfer belt 4 is hitched around driving rollers 5, and rotates by driving force of the driving rollers 5 towards the direction from the contact position with the photoconductor drum 1d to the contact position with the photoconductor drum 1a.

A transfer roller 6 makes an incoming sheet (as mentioned below) contact the transfer belt 4, and secondarily transfers the toner image on the transfer belt 4 to the sheet. The sheet on which the toner image has been transferred is transported to a fuser 9, and consequently, the toner image is fixed on the sheet.

A roller 7 includes a cleaning brush, and removes residual toner on the intermediate transfer belt 4 by the cleaning brush contacting to the intermediate transfer belt 4 after transferring the toner image to the sheet and/or after toner density calibration or toner gradation calibration.

A sensor 8 irradiates the intermediate transfer belt 4 with a light beam, and detects its reflection light from a surface of the intermediate transfer belt 4 or a toner pattern on the intermediate transfer belt 4. For example, in toner gradation calibration, the sensor 8 irradiates a predetermined area (an area onto which a toner patch for calibration is transferred) on the intermediate transfer belt 4 with a light beam, detects its reflection light, and outputs an electronic signal corresponding to the received light amount.

Further, the image forming apparatus of this embodiment includes plural sheet cassettes 11 and 12.

The sheet cassette 11 is enabled to be opened and closed; in the open status, a user or the like supplies one or plural sheets 101 (i.e. a bunch of sheets) of a specific size into the sheet cassette 11, and in the close status, the sheet cassette 11 pushes up the sheets 101 with a lift plate 21 so as to cause the sheets 101 to contact to a pickup roller 22. A driving mechanism of the lift plate 21 is configured, for example, to mechanically push up the lift plate 21 by using an action for moving the sheet cassette 11 to the close status. The sheets 101 on the sheet cassette 11 are fed to a sheet feeding roller 23 by the pickup roller 22 one by one from the top of the bunch of the sheets 101. The sheet feeding roller 23 is a roller that transports to a transportation path the sheets 101 one by one fed by the pickup roller 22 from the sheet cassette 11.

Similarly, the sheet cassette 12 is enabled to be opened and closed; in the open status, a user or the like supplies one or plural sheets 102 (i.e. a bunch of sheets) of a specific size into the sheet cassette 12, and in the close status, the sheet cassette 12 pushes up the sheets 102 with a lift plate 24 so as to cause the sheets 102 to contact to a pickup roller 25. A driving mechanism of the lift plate 24 is configured, for example, to mechanically push up the lift plate 24 by using an action for moving the sheet cassette 12 to the close status.

The sheets 102 on the sheet cassette 12 are fed to a sheet feeding roller 26 by the pickup roller 25 one by one from the top of the bunch of the sheets 102. The sheet feeding roller 26 is a roller that transports to a transportation path the sheets 102 one by one fed by the pickup roller 25 from the sheet cassette 12.

A transportation roller 27 is a transportation roller on a transportation path common to the sheets 101 and 102 transported from the sheet cassettes 11 and 12.

A registration roller 28 temporarily stops the incoming sheet on the transportation path and thereafter transports the sheet to the transfer roller 6 at a transportation timing adjusted so that a toner image on the intermediate transfer belt 4 is transferred at a specified position in the sheet.

A registration sensor 29 is arranged near the registration roller 28, and is a sensor that detects that the sheet reaches the registration roller 28.

A sheet detection sensor 30 is arranged at a predetermined position along a transportation path between the registration sensor 29 and the sheet cassettes 11 and 12, and is a sensor that detects that the sheet transported from the sheet cassettes 11 and 12 (here, a front end of the sheet) passes through the predetermined position. For example, the sheet detection sensor 30 is an optical sensor.

The sheet detection sensor 30 is used to detect that sheet jam occurs in the transportation path. The sheet detection sensor 30 shown in FIG. 1 is arranged along a transportation path common to plural sheet cassettes 11 and 12. Alternatively, plural sheet detection sensors 30 are arranged along transportation paths of the plural sheet cassettes 11 and 12, respectively.

When the sheet cassette 11 is specified as a sheet supply for printing, the rollers 23 and 27 transport a sheet 101 to the registration roller 28. Likewise, when the sheet cassette 12 is specified as a sheet supply for printing, the rollers 26 and 27 transport a sheet 102 to the registration roller 28.

Figure 2:
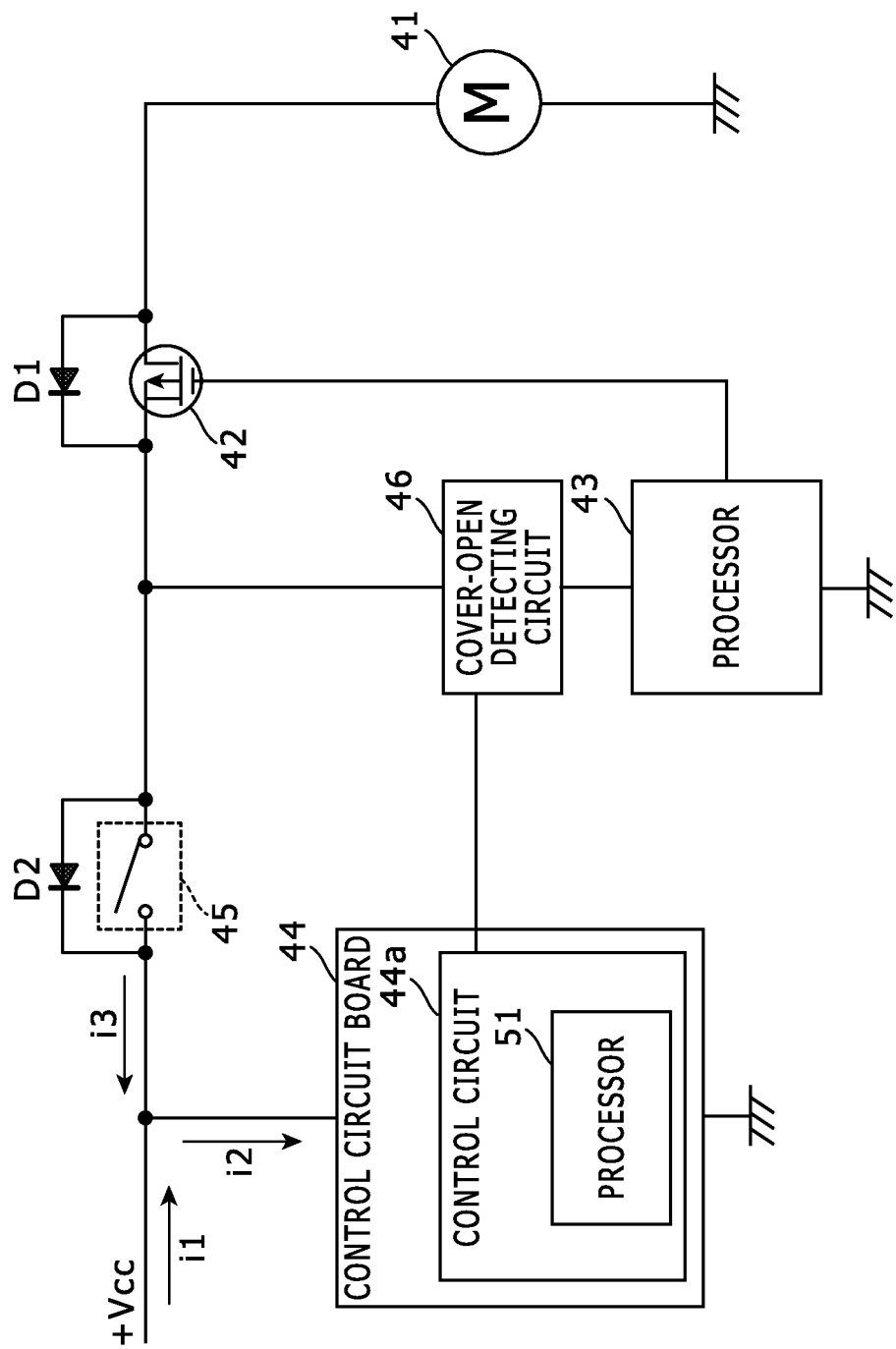
FIG. 2 shows a circuit diagram that indicates an example of a configuration of a motor driving system in the image forming apparatus shown in FIG. 1.

FIG. 2 shows a circuit diagram that indicates an example of a configuration of a motor driving system in the image forming apparatus shown in FIG. 1.

As shown in FIG. 2, this image forming apparatus includes a motor 41, a switching element 42, a regeneration diode D1, and a processor 43.

The motor 41 is supplied electric power from a predetermined power supply (here, 24 Volt system), and drives a roller (here, the transportation roller 27 and/or the like) that transports a printing sheet.

The switching element 42 performs an on-off action and thereby controls the motor 41.

Here the switching element 42 is a P channel MOSFET (Metal-Oxide-Semiconductor Field-Effect Transistor).

The regeneration diode D1 is arranged to the switching element 42, is a diode to cause a current due to electromotive force induced by the not-driven motor 41 to flow upstream when the switching element 42 is in an open status.

The processor 43 acts with a power supply system (here, 5 Volt system) different from the aforementioned power supply system, and controls the switching element 42 on on-off control basis and thereby causes the motor 41 to perform a predetermined action. As the processor 43, a CPU (Central processing unit) or the like is used.

Further, as shown in FIG. 2, this image forming apparatus includes a control circuit board 44, an interlock switch 45, a regeneration diode D2, and a cover-open detecting circuit 46.

The control circuit board 44 includes a control circuit 44a connected to the aforementioned predetermined power supply system (here, 24 Volt system).

The interlock switch 45 is arranged between the motor 41 and the control circuit 44a in the aforementioned power supply system (here 24 Volt system), and breaks power supply to the motor 41 when an unshown cover is opened and thereby stops sheet transportation or the like.

When an unshown cover is in an open status (here, this cover is a cover opened to pull out a printing sheet or a document sheet stopped on a transportation path due to jam or the like), the interlock switch 45 is in an open status (i.e. breaking status), and when the unshown cover is in a close status, the interlock switch 45 is in a close status (i.e. conducting status).

The regeneration diode D2 is arranged to the interlock switch 45, is a diode to cause a current due to electromotive force induced by the not-driven motor 41 to flow to the control circuit board 44 when the interlock switch 45 is in an open status.

Further, the control circuit 44a includes a processor that acts in accordance with a program, and increases power consumption of the processor 51 by changing an action of the processor 51 if the interlock switch 45 breaks power supply from the aforementioned power supply system to the motor 41.

For example, if the interlock switch 45 breaks power supply from the power supply system to the motor 41, the control circuit 44a causes the processor 51 to repeatedly process a no operation code and thereby increases power consumption of the processor 51.

Further, for example, the processor 51 includes an analog circuit that performs a specific process and controls the analog circuit on on-off control basis. If the interlock switch 45 breaks power supply from the power supply system to the motor 41, the control circuit 44a causes the processor 51 to turn on the analog circuit in an off status and thereby increases power consumption of the processor 51.

For example, if the interlock switch 45 breaks power supply from the power supply system to the motor 41, the control circuit 44a increases a clock frequency of the processor 51 and thereby increases power consumption of the processor 51. As the processor 51, a CPU, an ASIC (Application Specific Integrated Circuit) that includes a processor core or the like is used.

If the processor 51 acts with a voltage (e.g. 5 Volt) different from a power supply voltage (here 24 Volt) of the aforementioned power supply system, the control circuit 44a includes a DC-DC converter, and converts the voltage using the DC-DC converter and supplies electric power to the processor 51 with the voltage after the conversion.

Further, the cover-open detecting circuit 46 is a circuit that detects opening a predetermined cover on the basis of a voltage at the motor 41 side of the interlock switch 45.

Specifically, when the voltage at the motor 41 side of the interlock switch 45 is less than a predetermined value, the cover-open detecting circuit 46 determines that a predetermined cover is opened, and supplies to the processor a signal that indicates cover-open. The processor 43 receives the signal, and upon receiving the signal, continuously keeps the switching element 42 in an off status.

The following part explains a behavior of the aforementioned image forming apparatus.

When detecting sheet jam with the sheet detection sensor 30 or the like while a sheet is transported, the processor 43 controls the switching element 42 and thereby stops an action of the motor 41. Consequently, the sheet transportation is stopped. Afterward, when a user opens a predetermined cover in order to remove a sheet on the transportation path, the interlock switch 45 gets to be in an open status. Subsequently, the cover-open detecting circuit 46 detects the cover open.

Further, when a predetermined cover is opened during a sheet transportation, the interlock switch 45 gets to be in an open status. Consequently, the voltage decreases at the motor 41 side of the interlock switch 45. Therefore, the cover-open detecting circuit 46 detects the cover open, and subsequently the processor 43 controls the switching element 42 and thereby stops an action of the motor 41.

When the cover-open detecting circuit 46 detects the cover open as mentioned, the control circuit 44a changes an action of the processor 51 as mentioned and thereby increases power consumption of the processor 51.

While an action of the motor 41 is stopped, an incoming power current i1 from a power supply system +Vcc entirely flows into the control circuit board 44. Thus, an incoming current i2 that flows into the control circuit board 44 is equal to the power current i1.

When a user pulls out a sheet stopping and contacting to a roller such as the transportation roller 27, the roller rotates and thereby the motor 41 rotates with the roller and electromotive force is induced in the motor 41.

A current i3 due to this electromotive force flows from the motor 41 through the regeneration diodes D1 and D2 to the control circuit board 44.

An increment di2 of the incoming current i2 due to the aforementioned increase of power consumption of the processor 51 is set to be larger than the current i3 due to the electromotive force. Therefore, at this time point, even under the condition that the power supply voltage of the control circuit board 44 is controlled as a constant voltage, the current i3 due to the electromotive force flows into the control circuit board 44 and the power current i1 decreases only by the current i3, and consequently, the current i3 due to the electromotive force does not flow reversely to the power supply side.

Afterward, when the cover-open detecting circuit 46 detects that the aforementioned predetermined cover is closed, the control circuit 44a restores an action of the processor 51 and thereby changes power consumption of the processor 51 to that in a normal operation (i.e. an operation before changing the action of the processor 51).

As mentioned, in this embodiment, the motor 41 is supplied electric power from a predetermined power supply system, and drives a roller that transports a printing sheet or a document sheet. The interlock switch 45 is arranged between the motor 41 and the control circuit 44a in this power supply system. The regeneration diode D2 is arranged to the interlock switch 45. Further, the control circuit 44a includes the processor 51 that acts in accordance with a program, and increases power consumption of the processor 51 by changing an action of the processor 51 if the interlock switch 45 breaks power supply from the power supply system to the motor 41.

Consequently, with restraining increase of a cost of the apparatus, it restrains a failure that occurs due to the electromotive force of the motor 41 when pulling out a sheet due to jam or the like.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the image forming apparatus may include an image scanning device that optically scans a document image from a document sheet, and the motor 41 may be a motor that drives a transportation motor that transports the document sheet in an auto document feeder of the image scanning device.

Further, in the aforementioned embodiment, the processor 43 is installed other than the processor 51. Alternatively, the processor 51 may have a function of the processor 43 so that the processor 43 is not installed.

What is claimed is:

1. An image forming apparatus, comprising:
   a roller configured to transport a printing sheet or a document sheet;
   a motor configured to drive the roller, the motor supplied electric power from a predetermined power supply system;
   a control circuit connected to the predetermined power supply system;
   an interlock switch arranged between the motor and the control circuit in the power supply system; and
   a regeneration diode arranged to the interlock switch;
   wherein the control circuit comprises a processor configured to act in accordance with a program, and increases power consumption of the processor by changing an action of the processor if the interlock switch breaks power supply from the power supply system to the motor.

2. The image forming apparatus according to claim 1, wherein if the interlock switch breaks power supply from the power supply system to the motor, the control circuit causes the processor to repeatedly process a no operation code and thereby increases power consumption of the processor.

3. The image forming apparatus according to claim 1, wherein the processor comprises an analog circuit and controls the analog circuit on on-off control basis; and
   if the interlock switch breaks power supply from the power supply system to the motor, the control circuit causes the processor to turn on the analog circuit in off status and thereby increases power consumption of the processor.

4. The image forming apparatus according to claim 1, wherein if the interlock switch breaks power supply from the power supply system to the motor, the control circuit increases a clock frequency of the processor and thereby increases power consumption of the processor.

* * * * *